Dec. 23, 1947.  R. J. BRITTAIN, JR  2,433,022
JOURNAL BOX
Filed Aug. 3, 1944   2 Sheets-Sheet 1

INVENTOR:
RICHARD J. BRITTAIN JR.
BY Romeyn A. Spare
HIS ATTORNEY.

Patented Dec. 23, 1947

2,433,022

UNITED STATES PATENT OFFICE 2,433,022

JOURNAL BOX

Richard J. Brittain, Jr., Bloomfield, N. J., assignor to General Motors Corporation, Detroit, Mich., a corporation of Delaware Application August 3, 1944, Serial No. 547,839

10 Claims. (Cl. 308—41)

This invention relates to journal boxes and comprises all of the features of novelty herein disclosed. An object of the invention is to provide an improved thrust construction for absorbing axle thrust as when the axle shifts endwise in use. Another object is to provide a thrust construction in which the thrust elements are readily assembled and disassembled from the front of the box and which when removed, give ready access to the interior of the box. Another object is to provide a resilient thrust construction which is readily adaptable to various types of mountings.

To these ends and also to improve generally upon devices of this character, the invention consists in the various matters hereinafter described and claimed. In its broader aspects, the invention is not necessarily limited to the construction selected for illustrative purposes in the accompanying drawings in which Fig. 1 is a vertical central section of the box.

Figure 2:
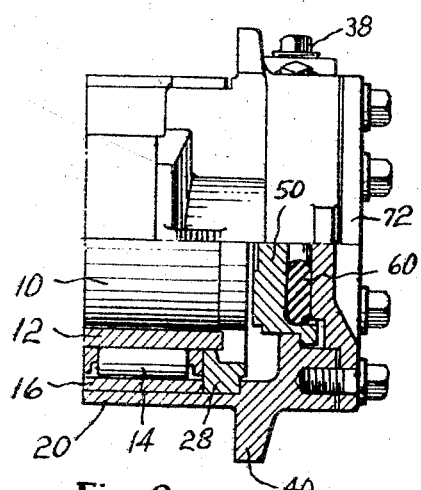
Fig. 2 is one-half a central horizontal section and one-half a plan view of the outer portion of the box.
Figure 3:
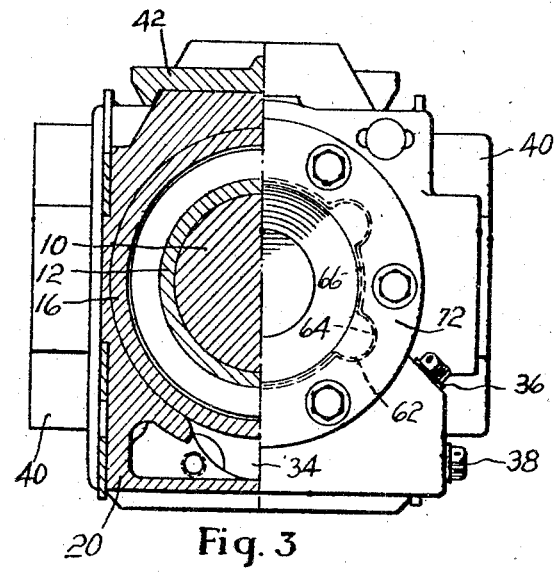
Fig. 3 is one-half a central vertical section and one half an end view.

The numeral 10 indicates an axle supporting a race-way sleeve 12 for two rows of caged rollers 14 which run in an outer raceway sleeve 16 fitting in the bore of a journal box 20, the sleeve 16 abutting at one end against an inner end cap 22 which extends into a water guard 24 carried by the hub 26 of a car wheel. The sleeve 16 also abuts against an oil collecting ring 28 which engages a shoulder in the box, the ring having ports 30 near the top to collect oil from the bearings and conduct it over a spout 32 to a thrust block. The bottom of the box has a cored out reservoir 34 communicating at opposite ends with the roller bearings. Oil is inserted at a plug 36 and drained at a plug 38. The box has the usual pedestal flanges 40 at the sides and a recess for an equalizer seat plate 42 at the top.

Figure 4:
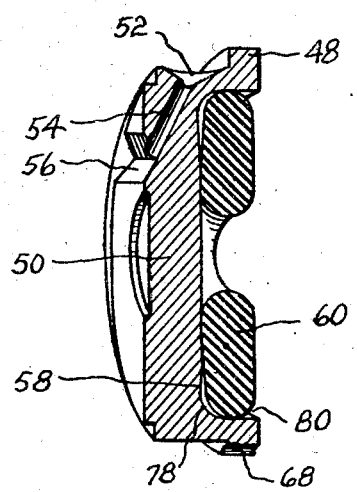
Fig. 4 is an enlarged vertical section of the thrust block containing a resilient member in an uncompressed or unloaded form.
Figure 5:
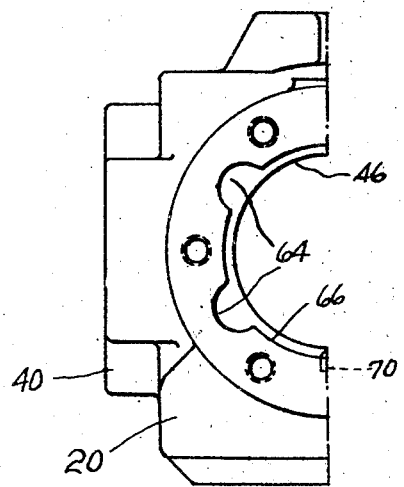
Fig. 5 is an end view of the left side of the box, the end cap being removed.
Figure 6:
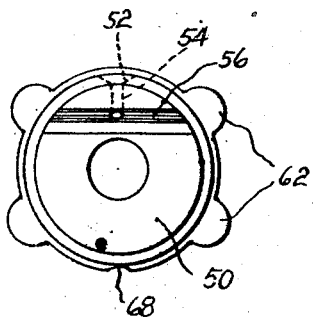
Fig. 6 is a face view of the thrust block.

Near the outer or front end of the box is an inwardly projecting flange 46 abutting laterally against an outwardly extending rim or flange 48 on a cup shaped thrust block 50. The thrust block has a cavity 52 at the top to receive oil dripping from the spout 32, the oil then descending through an inclined port 54 to a groove 56 extending across the thrust surface horizontally. Oil is distributed over the thrust faces of the axle 10 and the thrust block when the rotating axle shifts endwise against the block. The outer portion of the block has a circular recess whose end wall 58 is universally convex or crowned to engage the side of a narrow resilient cushion or pad 60 made in the form of a washer or doughnut which, when unconfined as shown in Fig. 4, decreases in thickness from the center outwardly. It is preloaded when installed as will appear and is preferably composed of synthetic rubber or the like.

The flange 48 of the thrust block has a series of outwardly projecting rounded lugs 62 arranged to enter similarly rounded recesses 64 which extend outwardly from an otherwise cylindrical surface 66 in the box. The bottom of the thrust block has a notch 68 overlying a port 70 in the box to drain oil which might otherwise collect in the pad compartment which is closed by an end cap 72 bolted to the box over a gasket. The end cap has a cylindrical pilot portion 74 to fit in the cylindrical surface 66 and a second cylindrical portion or extension 76 of smaller diameter to enter the circular recess in the thrust block, the inner face of the extension 76 being flat to engage and compress the pad 60. The pad is given an initial load or compression when the end cap is bolted home, the thrust block flange 48 being thereby pressed against the overlapping box flange 46 which limits movement of the thrust block towards the axle, and the pad becoming nearly parallel sided when compressed. In effect, the lugs 62 form an interrupted flange or projection on the thrust block to overlap the flange 46.

When the axle shifts endwise to engage the thrust block with sufficient force to overcome the initial load on the pad, the pad will be compressed to fill in the space at the region 78 of Fig. 4 and, as increasing load is applied, the pad will fill in at the region 80 and also the bore or hole will tend to get smaller. There is a progressively increasing resistance to outward movement of the thrust block to absorb thrust. The space between the flange 48 and the end cap just outside of the surface 60 allows a limited outward motion of the thrust block. The pad and the thrust block are accessible for endwise removal as a unit when the end cap is removed as to inspect the interior of the box through the large opening defined by the box flange 46. It is unnecessary to drop the axle. The flange 46 will support the thrust block during assembly and the thrust block will support the narrow pad while the end cap is supported by its pilot portion 74 in the bore 66 as the clamping bolts are set up to apply the initial load to the pad. Little space is taken up beyond the end of the axle.

Figures 1, 1A:
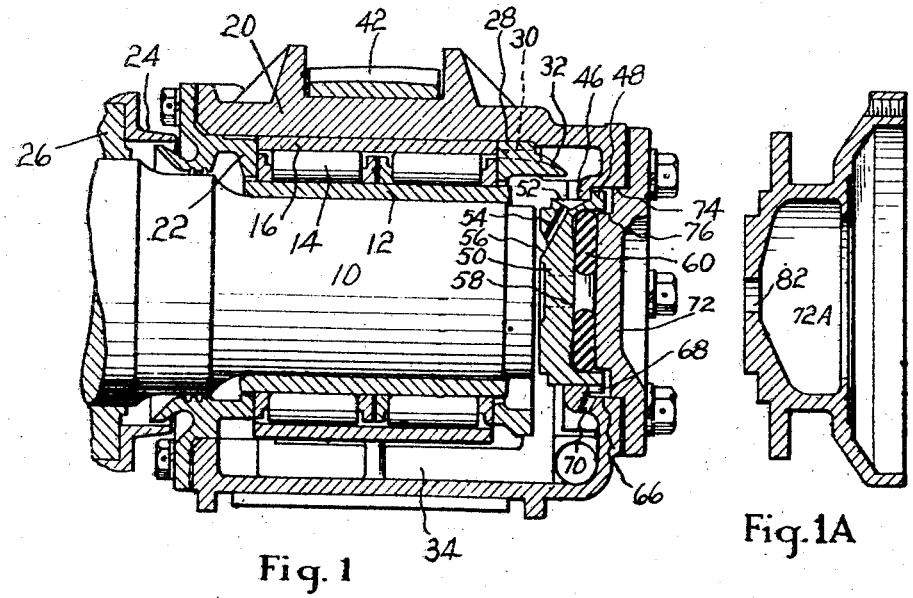
Fig. 1A is a sectional view of a modified end cap or adapter.

As indicated in Fig. 1A this type of cushioned thrust construction is readily adaptable for use with a box supported generator driven by the axle to control braking as in the well known "Decellostat." For such use, the end cap 72 is replaced with an adapter cap 72A having an extension for supporting the generator housing, the adapter having a central hole at 82, and the thrust block 50 then having a similar hole aligned therewith as indicated by broken lines in Figure 1 for the usual generator drive shaft which is keyed to the axle. The thrust block may be initially bored so that the change from one mounting to the other requires only the replacing of the cap 72 with the cap 72A.

I claim:

1. In a device of the character indicated, a journal box, an axle journalled in the box, the outer end of the box having an opening as large as the axle and defined by an inwardly projecting flange, a cup shaped thrust block supported in the opening and having an outwardly projecting flange overlapping the box flange, the outer side of the thrust block having a circular recess, a resilient washer contained in the recess, and an end cap secured to the box and having a face engaging the outer side of the resilient washer.

2. In a device of the character indicated, a journal box, an axle journalled in the box, the outer end of the box having an opening as large as the axle and defined by an inwardly projecting flange, a cup-shaped thrust block mounted within and extending through the opening defined by the flange and having an outwardly projecting flange overlapping the box flange, the outer side of the thrust block having a recess, a resilient pad in the thrust block recess, and an end cap secured to the box and having an extension projecting into the recess to engage the pad.

3. In a device of the character indicated, a journal box, an axle journalled in the box, the outer end of the box having an opening defined by an inwardly projecting flange, a thrust block supported by the flange and having an outwardly projecting flange overlapping the box flange, an end cap secured to the box, a narrow resilient pad interposed between the thrust block and the end cap, and one of the last named members having a shallow recess containing the pad.

4. In a device of the character indicated, a journal box, an axle journalled in the box, the outer end of the box having an opening defined by an inwardly projecting flange, a thrust block supported in the opening and having an outwardly projecting flange overlapping the box flange, an end cap secured to the box, a narrow resilient pad interposed between the thrust block and the end cap, one of the last named members having a shallow recess containing the pad, and the other member having an extension projecting into the recess to engage the pad.

5. In a device of the character indicated, a journal box, an axle journalled in the box, the outer end of the box having an opening as large as the axle, a thrust block supported in the opening, an end cap secured to the box, a resilient washer interposed between the thrust block and the end cap, one of the last named members having a recess containing the washer and one of them having its washer engaging face convexly crowned.

6. In a device of the character indicated, a journal box, an axle journalled in the box, the outer end of the box having an opening as large as the axle, a thrust block movably supported in the opening and having a recess in its outer side, a resilient pad contained in the recess, an end cap having an extension projecting into the thrust block recess, means for limiting movement of the thrust block towards the axle, and means for securing the end cap to the box.

7. In a device of the character indicated, a journal box, an axle journalled in the box, the outer end of the box having an opening as large as the axle, a thrust block movably supported in the opening, an end cap removably secured to the box, a narrow resilient pad interposed between the thrust block and the end cap, the pad inherently having a varying thickness from the center out, and means for limiting movement of the thrust block towards the axle to provide for compressing the pad when the end cap is bolted to the box.

8. In a device of the character indicated, a journal box, an axle journalled in the box, the outer end of the box having an opening defined by an inwardly projecting flange, a thrust block supported in the opening and having an outwardly projecting flange overlapping the box flange to limit movement of the thrust block towards the axle, an end cap secured to the box, a narrow resilient pad interposed between the thrust block and the end cap, the pad inherently having a varying thickness from the center out and being compressed to substantially uniform thickness when the end cap is bolted to the box.

9. In a device of the character indicated, a journal box, an axle journalled in the box, the outer end of the box having a substantially cylindrical surface and a flange projecting inwardly therefrom, a thrust block having a cylindrical surface fitting within the flange and an outwardly projecting flange overlapping the box flange, the outer side of the thrust block having a recess, a resilient pad in the recess, and an end cap having an extension piloted in the cylindrical surface of the box and a smaller extension projecting into the recess in the thrust block to engage the pad.

10. In a device of the character indicated, a journal box, an axle journalled in the box, the outer end of the box extending beyond the end of the axle and having an opening therethrough in line with the end of the axle and of substantially the same diameter, an apertured thrust block supported within the rim of the opening for axial movement therein and for axial removal through the opening, a resilient washer backing up the thrust block, an adapter cap for attachment to the end of the box across the box opening and having an opening aligned with the hole in the washer, the aperture in the thrust block and the center of the axle, and the cap having a face to engage the resilient washer and an extension for supporting an axle-actuated generator or the like.

RICHARD J. BRITTAIN, Jr.

REFERENCES CITED

The following references are of record in the file of this patent:

UNITED STATES PATENTS

| Number | Name | Date |
| --- | --- | --- |
| 1,872,039 | James | Aug. 16, 1932 |
| 2,320,809 | Wilson | June 1, 1943 |
| 1,493,416 | Angstrom | May 6, 1924 |
| 2,208,658 | Blackmore | July 23, 1940 |
| 2,273,308 | Young | Feb. 17, 1942 |
| 2,292,607 | Brittain | Aug. 11, 1942 |
| 402,987 | Sharpneck | May 7, 1889 |